US006948975B1

(12) United States Patent
Leung et al.

(10) Patent No.: US 6,948,975 B1
(45) Date of Patent: Sep. 27, 2005

(54) ALTERNATIVE LANTERN FLASHLIGHT BATTERY ADAPTOR

(75) Inventors: Fee Chan Leung, Hazlet, NJ (US); Michael T. Brundage, Howell, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/756,886

(22) Filed: Jan. 8, 2004

(51) Int. Cl.[7] .............................................. H01R 3/00
(52) U.S. Cl. ..................................... 439/500; 439/217
(58) Field of Search ............................... 439/217, 500, 439/638

(56) References Cited

U.S. PATENT DOCUMENTS

| 3,870,843 | A | * | 3/1975 | Witte | ...................... 200/302.2 |
| 4,806,440 | A | | 2/1989 | Hahs, Jr. et al. | |
| 5,240,787 | A | | 8/1993 | Goldschmidt et al. | |
| 5,250,891 | A | * | 10/1993 | Glasgow | ...................... 320/140 |
| 5,259,786 | A | * | 11/1993 | Huang | ........................ 439/500 |
| 6,050,694 | A | * | 4/2000 | Confrey | ........................ 362/86 |
| 6,315,425 | B1 | * | 11/2001 | Confrey | ........................ 362/86 |
| 6,508,313 | B1 | * | 1/2003 | Carney et al. | .................. 173/1 |

* cited by examiner

Primary Examiner—Renee Luebke
Assistant Examiner—James R. Harvey
(74) Attorney, Agent, or Firm—Michael Zelenka; Roger C. Phillips

(57) ABSTRACT

In accordance with an embodiment of the present invention, a lantern flashlight power source adaptor, which may be used with a battery that has an electrical socket, includes a member and an electrical plug that is supported by the member. The electrical plug may be dimensioned and configured to be connectable with an electrical socket of a battery and the adaptor may also include at least one terminal connector that is connected in circuit with the electrical plug and that is located on the member.

20 Claims, 2 Drawing Sheets

US 6,948,975 B1

ALTERNATIVE LANTERN FLASHLIGHT BATTERY ADAPTOR

GOVERNMENT INTEREST

The invention described herein may be manufactured, used, imported, sold, and licensed by or for the Government of the United States of America without the payment of any royalty thereon or therefor.

BACKGROUND OF THE INVENTION

1. Field of the Invention

The present invention relates generally to adaptors for power sources and, more particularly, to adaptors for power sources used in energizing a lantern flashlight.

2. Related Art

Devices for adapting cell type batteries for use in connection with lanterns are known. For example, U.S. Pat. No. 4,806,440 to Hahs, Jr. et al. describes a lantern battery substitute that has an upper assembly 10 and lower assembly 20. As illustrated in FIG. 1, the upper assembly 10 and lower assembly 20 may be fitted together and, as such, approximate the dimensions of a lantern battery. The upper assembly 10 comprises spring contacts 44 and 46 and the lower assembly includes electrical bridges 48, 50 and 52 between which an array of four "D" size battery cells is retained to provide a 6.0 volt output.

Another example is illustrated in U.S. Pat. No. 5,240,787 to Goldschmidt et al which describes a cell battery adaptor that has a main receptacle 10 and a hinged closure portion 20. As shown in FIG. 1, the hinged closure portion 20 connects with the main receptacle 10 via a hinge member 11 and may be opened to insert four "D" size batteries. A one-piece cell interconnecting element 60 may be disposed within the main receptacle and has contact rivets 74A–H for engaging and connecting the terminals of the four batteries.

While the above-described devices may be suitable for adapting cell type batteries for powering lanterns, to date, no suitable device is available for adapting high voltage batteries for use with, e.g., military type lantern flashlights. A long felt need exists for such a device as numerous high voltage batteries are available with a charge that is suitable for use with lantern flashlights. For example, the Army purchases approximately 300,000 BA-5590/U lithium batteries a year currently at a cost of approximately $75.00 per battery for a total of about $22.5 million a year. This particular battery is commonly used in manpack tactical radios such as the AN/PRC-119 SINCGARS radio. Under current operating procedures, the radio operator is responsible for insuring that the radio will not shut down during a mission. The operator risks disciplinary action by the unit commander if he fails to install a fresh battery during pre-mission preparations and the battery is depleted prior to completion of the mission. In one particular case, a SINCGARS radio can operate for 32 hours on one BA-5590/U battery, but the operator may change the battery every 24 hours. Partially used BA-5990/U batteries will be returned to the unit supply point with 25 percent energy (40-watt hours) remaining which represents approximately $18.75 worth of energy.

It is believed that the partially used high voltage battery has little likelihood of use, and the supply personnel generally choose to activate the battery's internal self-discharge circuit to discharge the battery to zero volts to prepare it for disposal. This can represent up to an estimated $5.625 million of wasted energy annually.

Accordingly, a need exists for a suitable adaptor for use with high voltage batteries.

SUMMARY OF THE INVENTION

In accordance with an embodiment of the present invention, a lantern flashlight power source adaptor, which may be used with a battery that has an electrical socket, comprises a member and an electrical plug that is supported by the member. The electrical plug may be dimensioned and configured to be connectable with an electrical socket of a battery and the adaptor may also comprise at least one terminal connector that is connected in circuit with the electrical plug and that is located on the member.

Another aspect of the invention involves a lantern power source adaptor that may be used with a battery that has an electrical socket comprises a member and an electrical plug supported by the member. The electrical plug may be dimensioned and configured to be connectable with an electrical socket of a battery. The adaptor may also comprise at least one terminal connector located on the member, an electrical disconnect circuit connected in circuit with the electrical plug, and an electrical down converter circuit connected in circuit with the electrical plug.

A further aspect of the present invention involves a lantern power source adaptor for use with a battery that comprises a member and a means for electrically connecting with an electrical output of a battery and which is supported by the member. The adaptor also comprises a terminal connector means that is connectable with a lantern and that is located on the member. A means for disconnecting the battery at a predetermined voltage may be in circuit with the battery connecting means and means for downconverting a voltage of the battery also may be connected in circuit with the battery connecting means.

BRIEF DESCRIPTION OF THE DRAWINGS

Other objects and advantages of the invention will be evident to one of ordinary skill in the art from the following detailed description made with reference to the accompanying drawings, in which.

DETAILED DESCRIPTION OF THE PREFERRED EMBODIMENT

One embodiment of the present invention provides for the adapting of high voltage batteries for use with, e.g., military type lantern flashlights. It has been found that there is enough remaining energy in a partially used high voltage battery to operate less critical items commonly found in a typical Army unit such as lantern flashlights. It is believed that the user is less likely to face disciplinary action if a lantern flashlight fails during a mission. Also, during the Vietnam War, the Vietcong guerillas were able to power the lights in the tunnel networks by using discarded US Army magnesium batteries.

In this embodiment, a prismatic cap may be provided which may have two threaded post terminals or two spiral spring terminals commonly found on traditional zinc carbon or alkaline lantern batteries for lantern flashlights. An interior of the prismatic cap may include a battery terminal interface and a water resistant seal.

An adjustable strap may be employed to retain the cap on a high voltage battery and internal circuits supported by the cap may function to reduce the battery voltage as needed by the lantern flashlight and to open the circuit to the battery when the battery voltage reaches the minimum operating voltage. Opening the circuit to the battery reduces the likelihood of venting of the battery. Advantageously, the voltage cut-off circuit will not reset unless the battery is replaced.

Figure 1:
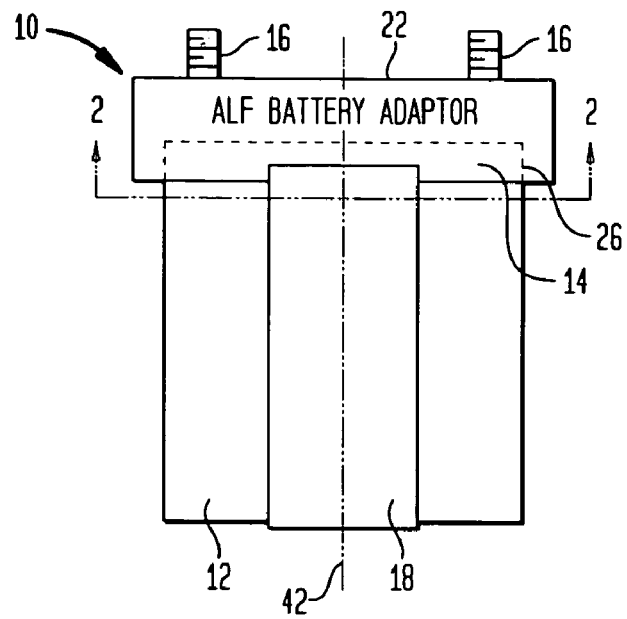
FIG. 1 is a front elevational view of a lantern flashlight battery adaptor in accordance with an embodiment of the present invention mounted to a high voltage battery.
Figure 2:
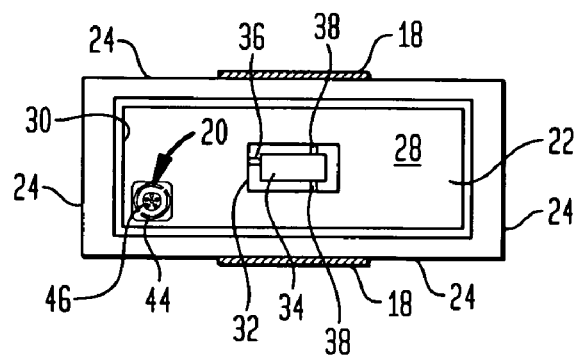
FIG. 2 is a sectional view taken along line 2 of FIG. 1, showing an underside of the lantern flashlight battery adaptor of FIG. 1, with the high voltage battery removed.

Referring now to FIGS. 1 and 2, a lantern flashlight battery adaptor in accordance with one embodiment of the present invention is illustrated generally at 10 and is shown as mounted to a high voltage battery 12. In this embodiment, the adaptor 10 may comprise a member or cap 14, electrical terminals 16, a holding strap 18 and an electrical connector such as a plug 20.

The cap 14 may be composed of a moldable polymeric substance such as a high density polyethylene and may comprise a plate 22 and side walls 24. The side walls 24 may extend in a perpendicular direction from the plate 22 and are preferably dimensioned to extend over and cover an upper portion 26 of the battery 12 to thereby form a cap-like structure. In order to prevent the ingress of moisture along an interior surface 28 of the cap 14, a sealing gasket 30 may be located adjacent the side walls 24. A recessed portion 32 may be provided for receipt of a circuit board 34 supporting a circuit that will be more fully described below. An input wire 36 and output wires 38 may extend through bores or recesses (not shown) in the cap 14 to electrically connect with the plug 20 and terminal connectors 16.

Figure 3:
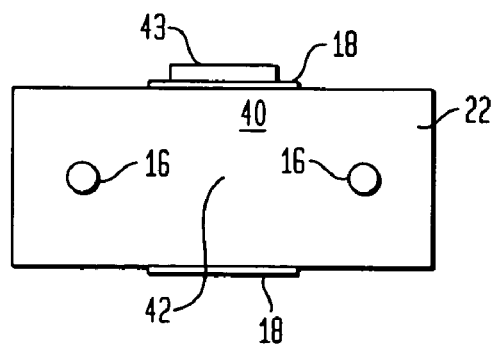
FIG. 3 is a top view of the lantern flashlight battery adaptor of FIG. 1.

Referring now to FIG. 3, the terminal connectors 16 may extend from an upper surface 40 of the plate 22 and may each comprise a known threaded rod configuration. The terminal connectors 16 may each be located in a symmetric manner about a central axis 42 (see also FIG. 1), although, it will be understood that the terminal connectors may be located similar to that of a civilian lantern battery such as Model MN-908 sold under the Trademark DURACELL. In such a case, the configuration of the plate 22 may be more square-shaped, rather than the rectangular configuration as shown, and one of the terminal connectors may be located concentric about a central axis thereof in a known manner. Also, it will be recognized that the terminal connectors 16 may comprise wire clamps (not shown) or a pair of wires having a conical, helical configuration.

The holding strap 18 is illustrated in FIGS. 1–3 and may comprise a textile. The holding strap 18 may also include an adjustment mechanism 43 for tightly securing the adaptor 10 to the battery 12. Optionally, the holding strap may be composed of a pair of legs that may be L-shaped in cross section and dimensioned to fit under at least partially under the battery 12. The legs may each be composed of a polymeric material similar to that of the cap 14 such as a high density polyethylene and may also be molded contemporaneously with the cap 14.

Figure 4:
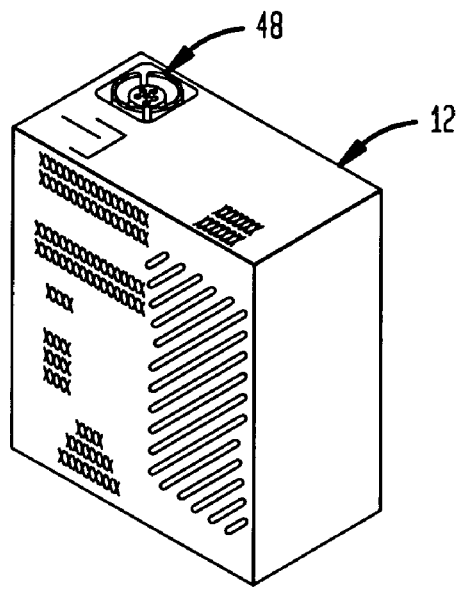
FIG. 4 is a perspective view of a high voltage battery.

With reference to FIG. 2, the plug 20 is shown for illustrational purposes as a male connector (designation SC-C-179492) and consequently may comprise a shield 44 and a plurality of pins 46. The plug 20 may be integrally formed with the cap 14 for ease in assembly, although, it will be understood that a separable plug connector may be employed in the practice of the present invention. Referring now also to FIG. 4, it will be appreciated that the plug 20 may be configured to correspond with a socket 48 of a high voltage battery 12, although, it may be of any suitable configuration for mating with any corresponding connector configuration. The battery 12, as illustrated in FIG. 4, may be a high voltage battery designated BA-5590/U which may comprise a lithium sulfide and which may have a reduced voltage level that may be approximately ten to sixteen volts.

Figure 5:
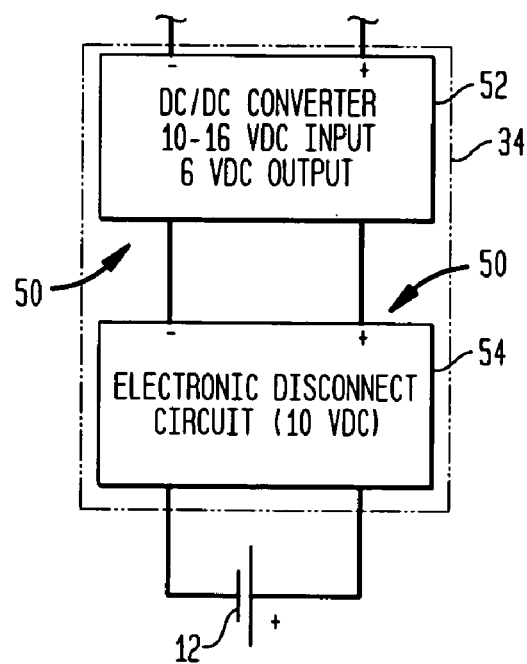
FIG. 5 is a schematic showing an electronic disconnect circuit and downconverter circuit that may be used with the lantern flashlight battery adaptor of FIG. 1.

As illustrated in FIG. 5, circuitry 50 may be employed on the circuit board 34 and may include a downconverting circuit 52 and, optionally, an automatic disconnect circuit 54. The downconverting circuit 52 may function in a known manner to reduce the relatively high voltage of the battery 12 to a suitable output voltage and may comprise a pair of transformer coils (not shown). In the present embodiment the battery 12 may function to reduce the voltage from between ten to sixteen volts to approximately six volts.

The disconnect circuit 54 may function to provide an automatic disconnect from a load, such as a lantern flashlight (not shown), at a low voltage and to thereby prevent toxic substances escaping from the battery. The disconnect circuit 54 may comprise a comparator (not shown) connected to open the circuit when the battery 12 reduces to approximately ten volts.

This embodiment of the present invention includes the following advantages.

1. Provides a reusable adaptor for lantern flashlights.

2. Provides for the use military lithium sulfur dioxide batteries in lantern flashlights.

3. Provides for the use of partially depleted lithium sulfur dioxide batteries that do not possess sufficient energy to meet minimum requirements for critical military items, but sufficient energy to power non-critical items. Without the present invention, the left over energy in these expensive lithium batteries will be wasted.

4. Provides a DC/DC converter that will reduce the high voltage military batteries to lantern voltage.

5. Provides an electronic battery disconnect circuit when the battery reaches minimum cut-off voltage to avoid lithium battery venting. Advantageously, the disconnect circuit may reset if the battery is replaced.

6. Provides an adaptor interface with battery that is water-resistant.

7. May be used on existing military batteries with no modifications.

8. Does not require special tools or training to install and operate.

While the present invention has been described in connection with what are presently considered to be the most practical and preferred embodiments, it is to be understood that the present invention is not limited to these herein disclosed embodiments. Rather, the present invention is intended to cover all of the various modifications and equivalent arrangements included within the spirit and scope of the appended claims.

What is claimed is:

1. A lantern flashlight power source adaptors, usable with a single battery having an end and an electrical socket, comprising:

a member comprising a plate portion having an outer periphery and a plurality of side wall portions extending substantially from the entire outer periphery of the plate portion and being engageable with the end of the battery;
an electrical plug supported by the member and the electrical plug comprising a generally tubular shaped shield having a cavity and a plurality of pins disposed within the cavity and being dimensioned and configured to be connectable with the electrical socket of the battery; and
at least one solderless electrical terminal connector connected in circuit with the electrical plug and being located on the member.

2. The adaptor of claim 1, wherein the at least one solderless electrical terminal connector comprises a plurality of solderless electrical terminal connectors being disposed symmetrically about a central axis of the member.

3. The adaptor of claim 1, further comprising:
a gasket mounted adjacent the plurality of side wall portions and the plate portion and the side wall portions together forming a cap structure and wherein the cap structure is dimensioned and configured to fit over and cover the end of the battery with the gasket forming a water tight seal between the cap structure and the battery.

4. The adaptor of claim 3, wherein the member comprises a holding strap configured to retain the member adjacent the end of the battery.

5. The adaptor of claim 1 wherein the electrical plug is configured under the Department of Defense designation SC-C-179492 and to engage an electrical socket of a battery having the Department of Defense designation BA-5590/U.

6. The adaptor of claim 1 wherein the member comprises a moldable polymeric material.

7. The adaptor of claim 6 wherein the electrical plug is integrally formed with the member.

8. The adaptor of claim 1, wherein the plate portion comprises a recessed portion that is disposed adjacent the end of the battery when the member is mounted to the battery and, further comprising:
an electrical circuit board comprising an electrical disconnect circuit configured to disconnect the battery from the at least one solderless electrical terminal connector and being connected in circuit with the electrical plug and wherein the electrical circuit board is located within the recessed portion.

9. The adaptor of claim 8, wherein the electrical disconnect circuit comprises a comparator configured to open the electrical disconnect circuit when a battery voltage reduces to approximately ten volts to prevent venting of toxic substances from the battery.

10. The adaptor of claim 8, further comprising a DC voltage downconverter circuit for reducing an output voltage of the battery and being connected in circuit between the electrical plug and the at least one solderless electrical terminal connector and the downconverter circuit being located on the electrical circuit board.

11. A lantern power source adaptor usable with a single battery having an end and an electrical socket, comprising:
a member comprising a plate portion having an outer periphery and a plurality of side wall portions extending substantially from the entire outer periphery of the plate portion and being engageable with the end of the battery;
an electrical plug supported by the member and the electrical plug comprising a generally tubular shaped shield having a cavity and a plurality of pins disposed within the cavity and being dimensioned and configured to be connectable with the electrical socket of the battery;
at least one solderless electrical terminal connector located on the member;
an electrical disconnect circuit configured to disconnect the battery from the at least one solderless electrical terminal connector and being connected in circuit with the electrical plug; and
an electrical down converter circuit for reducing an output voltage of the battery and being connected in circuit between the electrical plug and the at least one solderless electrical terminal connector.

12. The adaptor of claim 11, wherein the at least one solderless electrical terminal connector comprises a plurality of terminal connectors being disposed symmetrically about a central axis of the member.

13. The adaptor of claim 11, further comprising:
a gasket mounted adjacent the plurality of side wall portions and the plate portion and the side wall portions together forming a cap structure and wherein the cap structure is dimensioned and configured to fit over and cover the end of the battery with the gasket forming a water tight seal between the cap structure and the battery.

14. The adaptor of claim 13, wherein the member further comprises a holding strap configured to retain the member adjacent the end of the battery.

15. The adaptor of claim 11 wherein the electrical plug is configured under the Department of Defense designation SC-C-179492 and to engage an electrical socket of a battery having the Department of Defense designation BA-5590/U.

16. The adaptor of claim 11 wherein the member comprises a moldable polymeric material.

17. The adaptor of claim 16 wherein the electrical plug is integrally formed with the member.

18. A lantern power source adaptor usable with a single battery having an end, comprising:
a member comprising a plate portion having an outer periphery and a plurality of side wall portions extending substantially from the entire outer periphery of the plate portion and being engageable with the end of the battery;
means for electrically connecting with an electrical output of a battery, the battery connecting means comprising a generally tubular shaped shield having a cavity and a plurality of pins disposed within the cavity and being supported by the member;
solderless terminal connector means for connecting with a lantern and the terminal connector means being located on the member;
means for disconnecting the battery from the solderless terminal connector means at a predetermined voltage and the disconnecting means being in circuit with the battery connecting means; and
means for downconverting a voltage of the battery being connected in circuit between the battery connecting means and the solderless terminal connector means.

19. The adaptor of claim 18 wherein the battery connecting means is configured under the Department of Defense designation SC-C-179492 and to engage an electrical socket of a battery having the Department of Defense designation BA-5590/U.

20. The adaptor of claim 18 wherein the member comprises a moldable polymeric material.

* * * * *